E. BUGATTI.
CONNECTION OF AXLE PARTS.
APPLICATION FILED AUG. 26, 1913.
1,140,496.
Patented May 25, 1915.
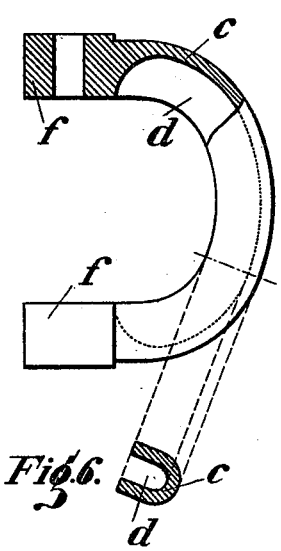
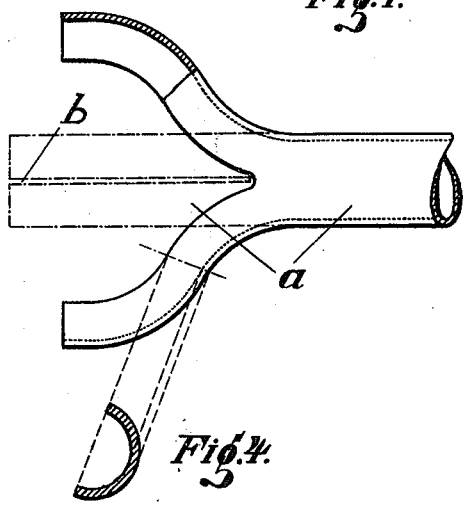
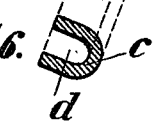
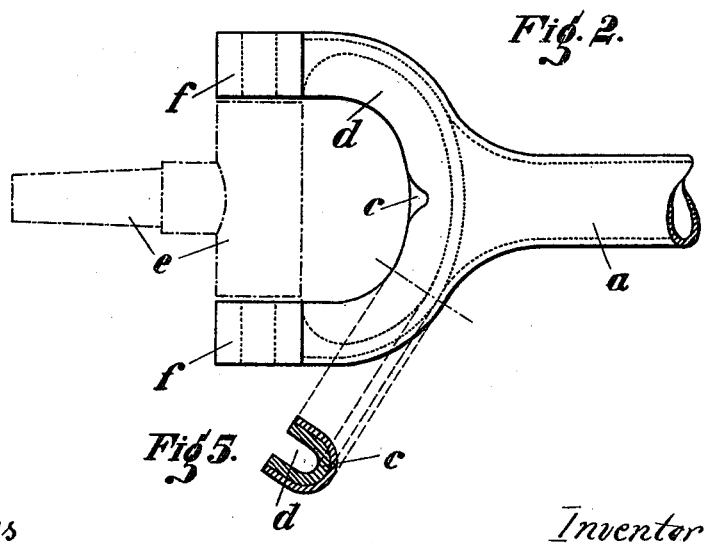
Witnesses
D. F. Schilling
Hermann Heuork
Inventor
Ettore Bugatti
by Paul P. Schilling
his attorney

UNITED STATES PATENT OFFICE.

ETTORE BUGATTI, OF MOLSHEIM, GERMANY.

CONNECTION OF AXLE PARTS.

1,140,496.  Specification of Letters Patent.  Patented May 25, 1915.

Application filed August 26, 1913.  Serial No. 786,810.

*To all whom it may concern:*

Be it known that I, ETTORE BUGATTI, a subject of the King of Italy, and residing at Molsheim, Alsace, Germany, have invented certain new and useful Improvements in the Connection of Axle Parts, of which the following is a specification.

The present invention has reference to an improved connection of axle parts, and relates more specifically to a procedure for securing the journal bearings or forks of the steering swivels to the front axle of motor vehicles.

It is now customary to secure the forks or yokes for the steering swivels to the hollow front axle ends by means of shanks extending from said forks, which shanks are then brazed to the axle ends. Inasmuch as the forks proper, in this construction, are freely exposed, they are easily subjected to fracture or loosening.

The object of this invention is to do away with these disadvantages, and I obtain this by splitting and spreading the axle ends and suitably securing the swivel bearing in these splayed, troughed axle ends.

In order to make this invention more readily understood, I will now describe it with reference to the accompanying drawing, in which—

Figure 1 represents a side elevation, partly in section, of the splayed axle end. Fig. 2 shows a side view of the axle end with introduced swivel fork part, the steering swivel being shown in dotted lines. Fig. 3 shows a side view of the swivel fork or yoke, partly in section. Figs. 4, 5 and 6 respectively show cross-sections through the troughed axle half, the swivel fork, and the combination of the two.

According to this invention the hollow axle $a$ is slit at the ends a distance of approximately half the length of the yoke part proper of the knuckle joint. The slit $b$ is shown in the dotted line portion in Fig. 1. The thus obtained axle halves are then splayed, the original cross-section (Fig. 4) remaining unaltered. The yoke part proper of the fork bearing $c$ is now introduced into the splayed axle ends and pressed home therein, as shown in Fig. 5. Finally the parts are brazed or welded together.

For reducing weight, the body of the yoke $c$ may be cut out as at $d$. The gudgeons of the steering swivel $e$, shown in dotted lines in Fig. 2, are rotatably journaled, in the usual manner, in the eyes $f$ of the fork bearing $c$.

The described connection of parts makes for great stability and effectively prevents the parts from working loose.

What I claim is:—

1. As an improved connection of axle parts in motor vehicles, in combination, a tubular front axle terminally split and splayed, the two resulting trough-shaped ends of said axle being bent to form a continuous arcuate housing, and a correspondingly arcuate swivel bearing yokes rigidly retained in said housing.

2. As an improved connection of axle parts in motor vehicles, in combination, a tubular front axle terminally split and splayed to form an arcuate troughed housing, and a correspondingly arcuate swivel bearing yoke, the said two arcuate parts being permanently joined by being clamped and brazed or welded together.

In testimony whereof I affix my signature in presence of two witnesses.

ETTORE BUGATTI.

Witnesses:
 JOSEPH ROHNER,
 MILO A. JEWETT.

Copies of this patent may be obtained for five cents each, by addressing the "Commissioner of Patents, Washington, D. C."